United States Patent
Ahn et al.

(10) Patent No.: US 8,458,211 B2
(45) Date of Patent: Jun. 4, 2013

(54) SEARCH QUERY HASH

(75) Inventors: Jungho Ahn, Palo Alto, CA (US); Justin J. Tansuwan, Mountain View, CA (US); Junyoung Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/234,503

(22) Filed: Sep. 16, 2011

(65) Prior Publication Data

US 2012/0005197 A1 Jan. 5, 2012

Related U.S. Application Data

(63) Continuation of application No. 11/847,114, filed on Aug. 29, 2007, now Pat. No. 8,032,527.

(51) Int. Cl.
*G06F 17/30* (2006.01)

(52) U.S. Cl.
USPC .......................................... 707/769; 707/791

(58) Field of Classification Search
None
See application file for complete search history.

(56) References Cited

U.S. PATENT DOCUMENTS

| | | | |
|---|---|---|---|
| 6,360,215 B1 | 3/2002 | Judd et al. | |
| 6,516,337 B1 | 2/2003 | Tripp et al. | |
| 2002/0019828 A1 | 2/2002 | Mortl | |
| 2002/0083008 A1 | 6/2002 | Smith et al. | |
| 2002/0103914 A1 | 8/2002 | Dutta et al. | |
| 2004/0225647 A1* | 11/2004 | Connelly et al. | 707/3 |
| 2004/0267731 A1 | 12/2004 | Gino et al. | |
| 2006/0004716 A1* | 1/2006 | Hurst-Hiller et al. | 707/3 |
| 2007/0061246 A1 | 3/2007 | Ramer et al. | |
| 2007/0192314 A1 | 8/2007 | Heggem | |
| 2007/0219979 A1 | 9/2007 | Jung et al. | |
| 2008/0104021 A1 | 5/2008 | Cai et al. | |
| 2008/0162540 A1 | 7/2008 | Parikh et al. | |

FOREIGN PATENT DOCUMENTS

| | | |
|---|---|---|
| CN | 1682215 A | 10/2005 |
| EP | 1385097 | 1/2004 |
| JP | 2005-107631 | 4/2005 |
| KR | 1020040084395 | 6/2004 |
| WO | WO2004025516 A2 | 3/2004 |

OTHER PUBLICATIONS

Notification of the First Office Action for CN Patent Appl. No. 200880112382, Sep. 15, 2011, 11 pages.
CN Second Office Action; Publication Issued; Jun. 6, 2012; 200880112382.X; 4 pages.
Notification of Transmittal of the International Search Report and the Written Opinion of the International Searching Authority, or the Declaration, Feb. 13, 2009, pp. 1-15.

* cited by examiner

*Primary Examiner* — Syed Hasan
(74) *Attorney, Agent, or Firm* — Fish & Richardson P.C.

(57) ABSTRACT

Apparatus, systems and methods for search filtering hash map are disclosed. Terms are designated as filtering terms, wherein at least one of the filtering terms includes only one component term, and at least one of the filtering terms includes a plurality of component terms in ordinal positions. A keyword hash map is generated for keywords, each keyword being one of the component terms and being mapped to one or more corresponding hashes in the hash map, and each corresponding hash having a corresponding level and a corresponding status, wherein each level corresponds to an ordinal position of its corresponding component term in a filtering term, and wherein each status designates its corresponding component term in the hash map as one of a filtering term or unfiltered term. The keyword hash map is stored in a memory storage system accessible by a data processing apparatus.

12 Claims, 7 Drawing Sheets

SEARCH QUERY HASH

CROSS-REFERENCE TO RELATED APPLICATIONS

This application is a continuation application of and claims priority to U.S. application Ser. 11/847,114, filed Aug. 29, 2007, entitled "Search Filtering," and which issued as U.S. Pat. No. 8,032,527 on Oct. 4, 2011, the entire disclosure of which is incorporated herein by reference.

BACKGROUND

This document relates to search filtering.

The rise of the Internet has enabled access to a wide variety of content items, e.g., video and/or audio files, web pages for particular subjects, news articles, etc. Content items of particular interest to a user can be identified by a search engine in response to a user query. One example search engine is the Google search engine provided by Google, Inc. of Mountain View, Calif., U.S.A. The query can include one or more search terms, and the search engine can identify and, optionally, rank the content items based on the search terms in the query and present the content items to the user (e.g., according to the rank).

The content items that are identified in response to a query may include material that is inappropriate for a particular user. For example, a juvenile may (intentionally or unintentionally) enter a query that will return adult-oriented content, and a search engine may identify material that is both appropriate and inappropriate for the juvenile. Various conventional processes have been developed to help prevent the serving of inappropriate content to particular users. For example, some search engines can require that a user provide verification data to a verification service upon detecting a search instance that includes inappropriate content. For example, a search engine can require that a user provide age verification data to an age verification service upon detecting a query that includes a "black-listed" search term or search results that include adult-oriented content. If the user's age cannot be verified, search results are not presented to the user.

Such a verification process, however, can degrade the user experience. For example, a user may not be interested in the adult-oriented content per se, but may instead be interested in journal articles studying the effects of such content on society, e.g., the societal effects of pornography on young women. A query directed to this particular interest, however, may include one or more black-listed terms or result in the identification of web sites that are inappropriate for some, e.g., juvenile, users. Accordingly, if the user is a juvenile, the user may not be able to access content that is appropriate for the user. Conversely, if the user is an adult, but the age verification service is not available, the user may not be able to access the content of interest.

SUMMARY

Apparatus, systems and methods for search filtering are disclosed. In one implementation, a query is received from a user device and a determination as to whether the query includes or is associated with a filter term is made. If the query is determined to include or be associated with (e.g., similar to, synonymous with, etc.) a filtering term, then filtered content items based on the query and the filtering term are identified and the filtered content items and access to a verification service that provides access approval or access denial for unfiltered content items that are responsive to the query are provided to the user device.

In another implementation, a query is received from a user device, and unfiltered content items in an information corpus that are responsive to the query are identified. A determination is made as to whether the unfiltered content items that are responsive to the query include or are associated with a filtering term. If the unfiltered content items that are responsive to the query include or are associated with the filtering term, then the unfiltered content items are filtered based on the filtering term to generate filtered content items. The filtered content items and access to a verification service that provides access approval or access denial for the unfiltered content items are provided to the user device.

In another implementation, a search instance associated with a user device is identified, and a determination is made as to whether the search instance includes or is associated with a filtering term. If the search instance is determined to include or be associated with a filtering term, then filtered content items in the search instance are identified, and the filtered content items and access to a verification service that provides access approval or access denial for unfiltered content items in the search instance are provided to the user device. Conversely, if the search instance is determine not to include a filtering term, then the unfiltered content items are provided to the user device.

In another implementation, a system includes search access instructions and verification service access instructions. The search access instructions are stored in a computer readable medium and upon execution by a processing device configure the processing device to identify a search instance associated with a user device and determine if the search instance includes or is associated with a filtering term. In response to determining that the search instance includes or is associated with a filtering term, the processing device can identify filtered content items in the search instance and provide the filtered content items to the user device. Conversely, in response to determining that the search instance does not include or is not associated with a filtering term, the processing device can identify unfiltered content items in the search instance and provide the unfiltered content item to the user device. The verification service access instructions are stored in a computer readable medium and upon execution by a processing device configure the processing device to provide the user device access to a verification service in response to the processing device executing the search access instructions determining that the search instance includes a filtering term.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
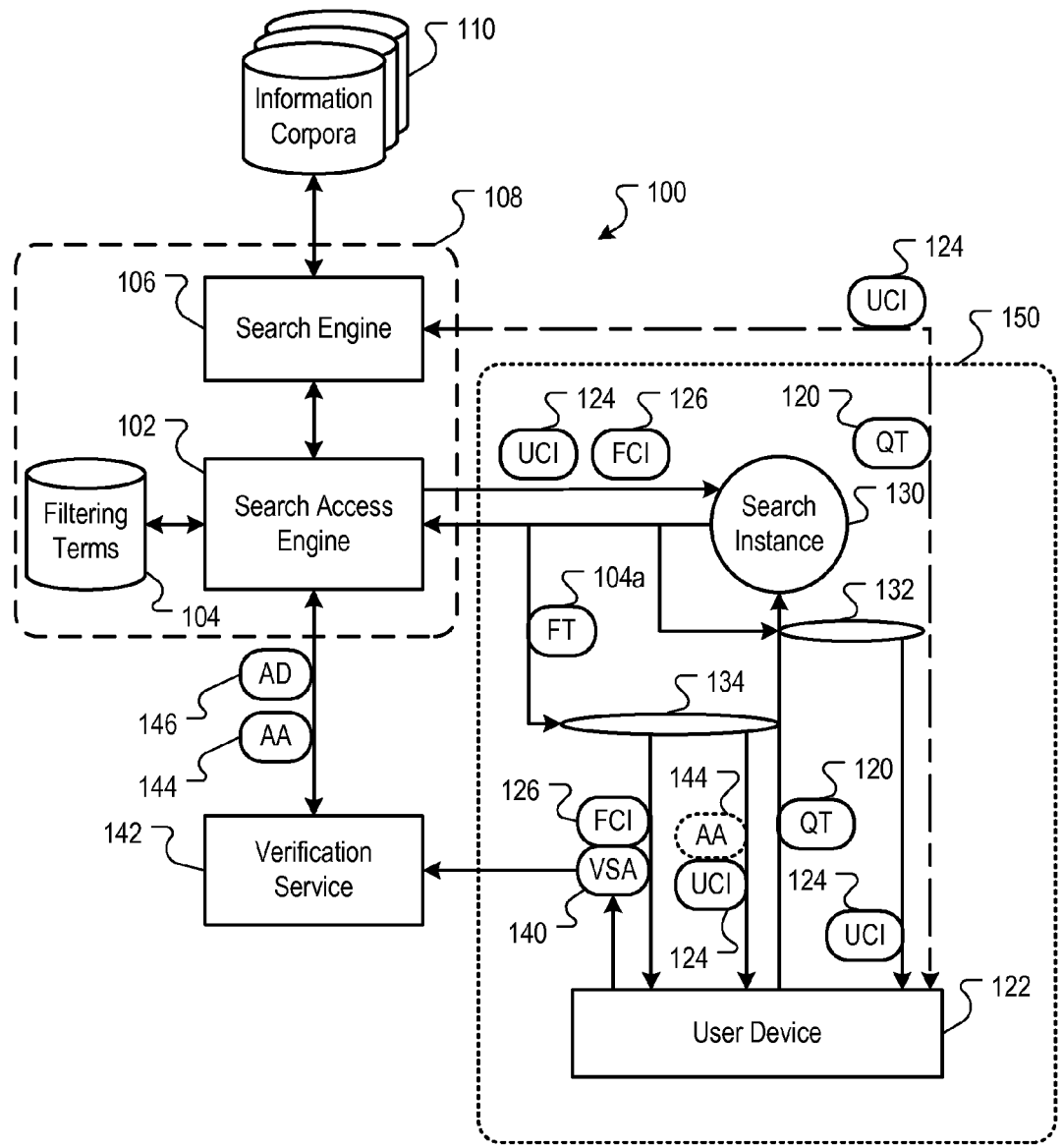
FIG. 1 is a block diagram of an example search filtering system.

FIG. 1 is a block diagram of an example search filtering system 100. In an implementation, a search access engine 102 can access a data store of filtering terms 104 and a search engine 106. In some implementations, the search access engine 102 and the data store of filtering terms 104 can be instantiations that are separate from the search engine 106. In other implementations, the search access engine 102, the data store of filtering terms 104, and the search engine 108 can be an integrated instantiation, as indicated by the dashed line 108.

The search access engine 102 and the search engine 106 can be implemented in one or more networked server computers, e.g., a server farm. The search engine 106 can be configured to access and process information corpora 110, e.g., thousands or even millions of content items, e.g., web-based documents, such as web pages, audio files, video files, image files, data files, blogs, etc. In some implementations, the information corpora 106 can be implemented as cached data stores that store web documents retrieved over the Internet and that are indexed by the search engine 106 to facilitate searching, identification and retrieval operations.

Such searching, identification and retrieval operations can occur in response to a query 120 including one or more query terms QT from a user device 122. Example user devices include personal computers, portable communication devices, set top boxes, or any other computer device operable to communicate data input by a user over a network, such as the Internet.

In response to the one or more query terms 120, the search engine 106 can identify one or more unfiltered content items (UCI) 124. The unfiltered content items 124 can be provided to the user device in the form or search results. Example search results include landing page links, e.g., uniform resource locators (URL) that are resolved to web sites that provide access to a content item. Selection of the landing page link will thus direct a software application running on the user device 102, e.g., a web browser, to the web site so that the user device 102 can access the content item.

Absent any monitoring of a search instance 130, e.g., monitoring of the one or more query terms 120 and/or the unfiltered content items 124, the unfiltered content items 124 will be provided to the user device 122. As described above, however, the unfiltered content items 124 that are identified in response to query terms 120 may include material that is inappropriate for a particular user. Thus, in some implementations, the search access engine 102 is configured to identify the search instance 130 associated with the user device 122 and determine if the search instance 130 includes or is associated with (e.g., related or synonymous or otherwise associated terms; flagged as a content item of particular content; etc.) one or more filtering terms 104. The filtering terms 104 can, for example, include a list of terms that are associated with particular subject matter, e.g., adult-oriented content, expletive infused content, racially insensitive content, or other material that is desired to be filtered. If the search access engine 102 determines that the search instance 130 does not include any of the filtering terms 104, as indicated by the search instance case 132, then the search access engine 102 can provide the unfiltered content items 124 to the user device 122 (or allow the unfiltered content items 124 to be provided to the user device 122).

Conversely, if the search access engine 102 determines that the search instance 130 includes or is associate with one or more filtering terms, e.g., filtering term 104a as indicated by the search instance case 134, then filtered content items (FCI) 126 are identified and provided to the user device 122. In some implementations, the filtered content items 126 are a subset of the unfiltered content items 124, and the unfiltered content items are content items that are identified in the information corpora 110 for the search instance 130. Additionally, verification service access (VSA) instructions 140 are provided by the user device 122. Upon execution by the user device 122, the verification service access instructions 140 provide the user device access to a verification service 142. The user of the user device 122 can thus access the verification service 142 to provide verification data.

The verification service 142 can, in response to the verification data (e.g., age verification data, membership verification data, etc.), provide access approval (AA) 144 or access denial (AD) 146 for unfiltered content items 124 that are responsive to the query 120. For example, if the verification service 142 is an age verification service, the user may be required to provide unique identification data, e.g., a name and a unique identification number that can be compared to an age verification database. If the verification data provided indicates the user is of the appropriate age (e.g., the age of majority), then the verification service 142 can provide access approval 144 to the search access engine 106. The search access engine 106 can, in turn, provide the unfiltered content items 124 to the user device 122 (or allow the unfiltered content items to be provided to the user device 122). Otherwise, the search access engine 106 can preclude the provisioning of the unfiltered content items 124 to the user device 122.

In some implementations, the verification service access instructions 142 can comprises be a link to a verification service 142 landing page at which the user may provide verification data directly to the verification service 142. In other implementations, the verification service access instructions 142 can be a user identification data input interface, e.g., editable data fields through which a user may provide verification data, and the search access engine 102 can forward the verification data to the verification service 142.

The processing of a single search instance has been described. However, users may often submit multiple queries during a session. In some implementations, the search access engine 102 can instantiate a user device session, as illustrated by the dashed line 150, and classify the device session as either an approved device session in response to receiving access approval from the verification service 142, or as a denied device session in response to receiving access denial from the verification service 142. Thereafter, the search access engine 102 can automatically provide unfiltered content items 124 to the user device 122 for device sessions that are classified as approved device sessions, and only provide filtered content items 126 to the user device 122 for device sessions that are classified as approved device sessions. The establishment of such a device session can eliminate or minimize the number of times a user must provide verification data to the verification service 142, thus improving the user experience.

The device session can be established in a variety of ways. For example, the search access engine 102 can store a temporary data file, such as a cookie, associated with the user device 102 that is either stored at the user device 102 or on a server device on which the search access engine 102 is instantiated. Alternatively, the device session can be established by logging into a user account associated with the user. Other ways of establishing and maintaining a device session can also be used.

The determination of whether a search instance 130 includes a filtering term 104 can be implemented by various processes. In some implementations, a search instance 130 can be a query, e.g., the query 120, received from the user device 122. The query 120 can be compared to the filtering terms 104 to determine whether the query 120 includes or is associated with a filtering term. In one implementation, the query 120 can be segmented into query components, e.g., words, and compared to a keyword hash map of "black-listed" and "white-listed" terms to determine whether the query includes a filtering term 104. For example, a black-listed term may include the constituent component AA followed by the constituent component BB. However, a white-listed term may include the constituent component AA, followed by the constituent component BB, and followed by the constituent component CC. An example hash map could be as follows in a Level/Component/Status format:

1/AA/WL→2/BB/BL→3/CC/WL→4/NULL/NULL→3/
EE/BL→4/NULL/NULL→2/FF/BL→3/NULL/NULL where "WL" indicates a while-listed term and "BL" indicates a "black-listed" term, i.e., a filtering term. In some implementations, queries that are not represented by the hash map can be deemed a white-listed term. Thus, if the query is "AADD," or AABBDD", the query is determined to not include a filtering term.

In some implementations, a filtering term in a query 120 can nevertheless be allowable if the filtering term is used in an approved context. For example, the word "nude" alone may be deemed to be a filtering term 104; however, the term "nude expression" may be deemed to not be a filtering term, as the term "nude" in the context of "expression" may be related to a free speech subject. Thus, the query can be determined to include the filtering term if the query context of the filtering term is not an approved query context, or can be determined to not include the filtering term if the query context of the filtering term is an approved context.

In some implementations, if the query 120 includes a filtering term, the search access engine 102 can generate a revised query based on the filtering term and provide the revised query to the search engine 106 to initiate a search of the information corpora 110 for content items that are responsive to the revised query. These content items that are responsive to the revised query can be identified as the filtered content items 126. Upon receiving an access approval 144, the search access engine 102 can provide the original query 120 to the search engine 106 to initiate a search for unfiltered content items, e.g., content items that are responsive to the original query. Examples of generating revised queries can include removing the filtering term from the query, or generating a negative Boolean term based on the filtering term. Other methods to generate a revised query can also be used.

In some implementations, if the query 120 includes a filtering term, the search access engine 102 can provide the query 120 to the search engine 106 to initiate a search for unfiltered content items, e.g., content items that are responsive to the query 120. The unfiltered content items 124 can thereafter be filtered by the filtering term 104 to exclude the content items that include the filtering term, and the resulting non-excluded content items can be identified as the filtered content items 126. Alternatively, the request sent to the search engine 106 can be filtered prior to submission to the search engine 106.

In some implementations, a search instance 130 can be the unfiltered content items 124 identified in response to the query 120. The search access engine 102 can determine whether the unfiltered content items 124 include a filtering term, and filter the unfiltered content items 124 based on any identified filtering term to generate the filtered content items 126. For example, the unfiltered content items 124 can be processed by the search access engine 102 to identify any filtering terms 104 present in the unfiltered content items 124. Those unfiltered content items 124 that do not include filtering terms 104 can be identified as filtered content items 126 and be provided the user device 122. Upon receiving an access approval 144, the search access engine 102 can provide the entire set of unfiltered content items 124 to the user device 122.

Figure 2:
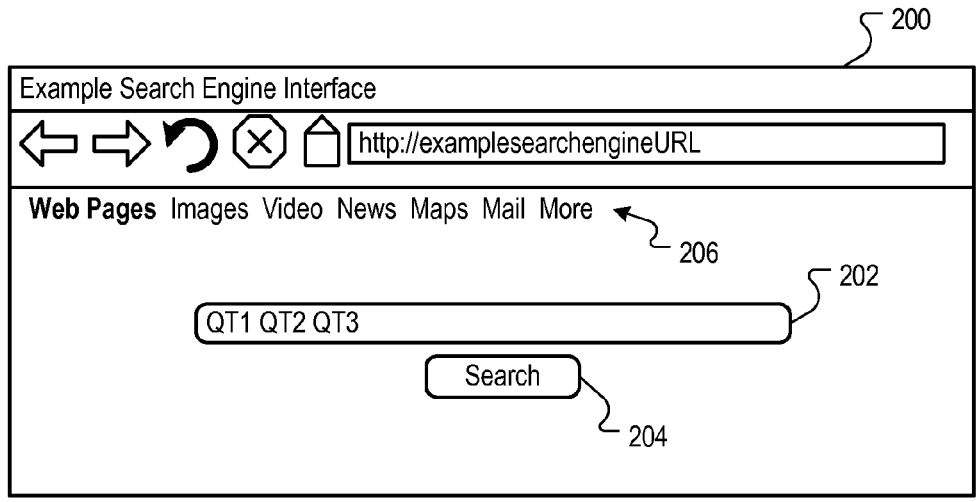
FIG. 2 is an example search entry environment.

FIG. 2 is an example search entry environment 200. The search entry environment 200 can be a web page associated with the search engine 106 or the search access engine 102. A query entry box 202 can be used to enter one or more query terms, e.g., QT1, QT2, and QT3. A search button 204 can be selected to submit the query terms to the search engine 106 to search of content items of a specified type 206, e.g., "Web Pages," that are response to the query terms. Pressing the search button 204 can cause the search accesses engine 102 to receive the query terms QT1, QT2 and QT3. Depending on the implementation, the search access engine 102 can determine if the query terms QT1, QT2 and QT3 include a filtering term or if the unfiltered content items 124 identified in the information corpora 110 in response to the query terms QT1, QT2 and QT3 include a filtering term and take the corresponding processing steps described above.

Figure 3:
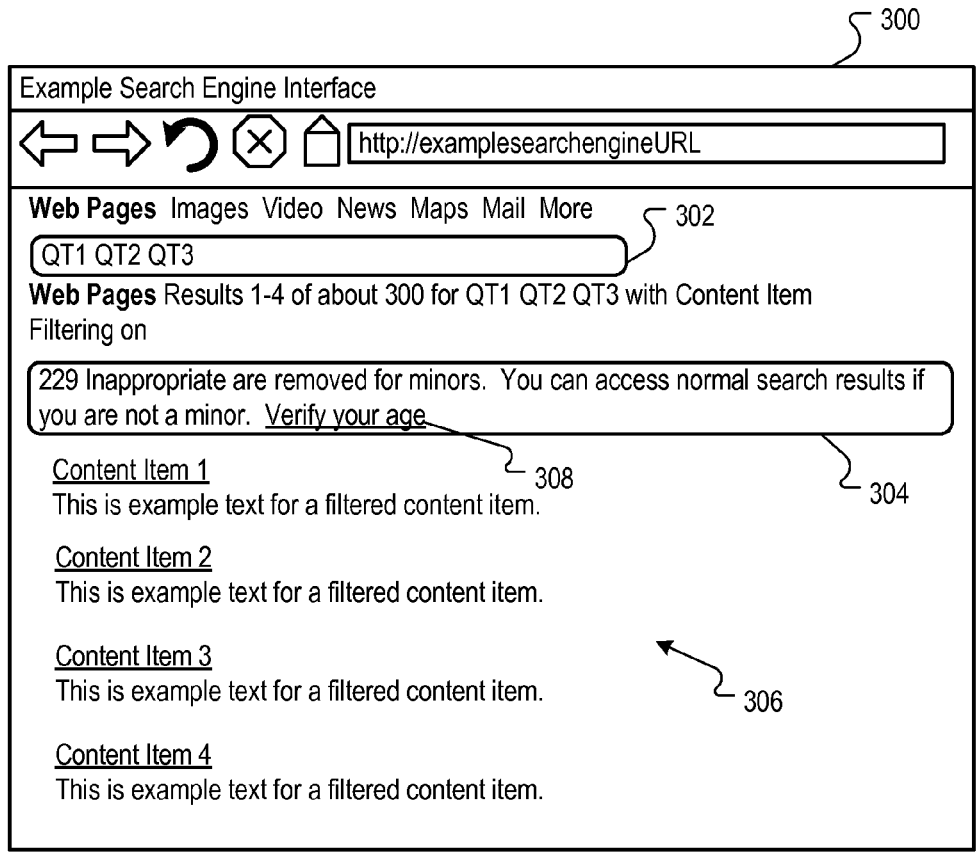
FIG. 3 is an example filtered search results environment.

FIG. 3 is an example filtered search results environment 300. The filtered search results environment 300 can be a web page associated with the search engine 106 or the search access engine 102. A query term box 302 displays the user entered query terms QT1, QT2 and QT3, and a verification alert box 304 informs the user that the approximately 229 unfiltered content items including content items that are inappropriate for certain users, e.g., minors, have been identified. Accordingly, a portion of a list 306 of approximately 300 filtered content items are displayed. The verification alert box 302 includes a link 308 that the user may select to gain access to a verification service, e.g., an age verification service.

Figure 4:
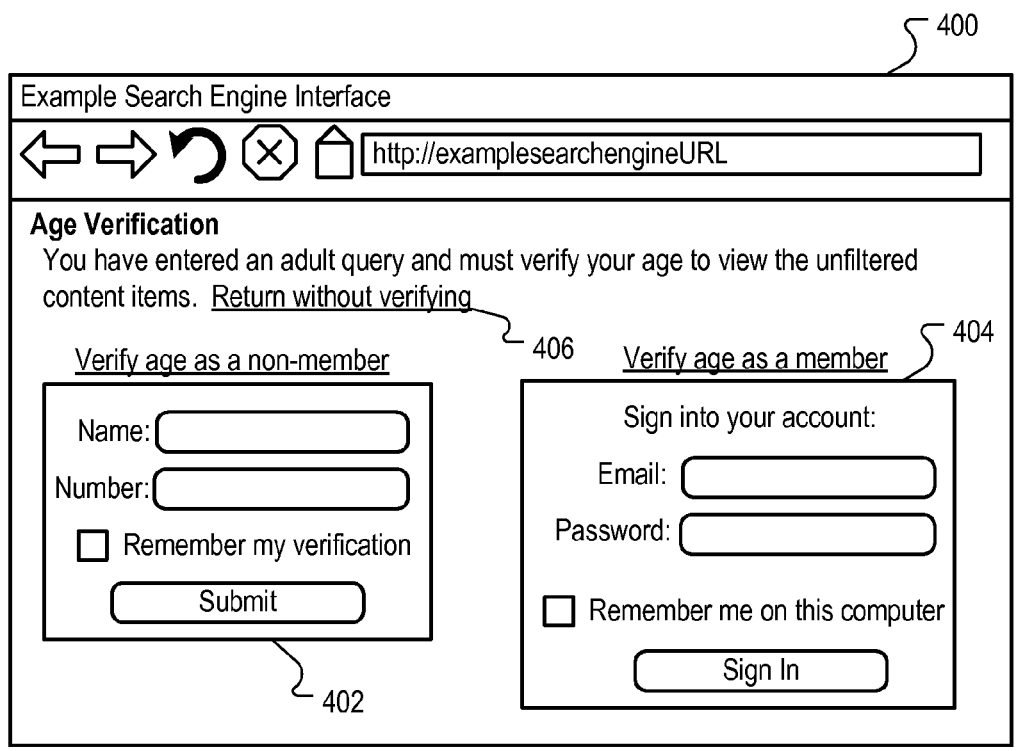
FIG. 4 is an example verification service access environment.

FIG. 4 is an example verification service access environment 400. The verification service access environment 400 can be a web page associated with the search engine 106 or the search access engine 102, and can be accessed by selecting the link 308 in the filtered search results environment 300. One or more user identification data input interfaces, e.g., data entry interfaces 402 and 404, can be presented to the user. Additionally, a link 406 to the filtered search results environment 300 can also be provided.

The first data entry interface 402 can request identification data for any user and provide the identification data provided by the user to the verification service 142. If the verification service 142 responds with an access approval, an unfiltered search results environment 500 can be provided to the user device. Conversely, if the verification service 142 responds with an access denial, only the filtered content items 126 are provided to the user device 122.

The second data entry interface 404 can user login data for a user account. The user account can, for example, be maintained by the search access engine 102 or by some other entity. Each user account can include age verification data for a particular user, and can also include data indicating whether the verification service 142 has provided access approval or access denial for that user. Thus, if a user logs into an account that includes data indicating that the verification service 142 has provided access approval for that user, then an unfiltered search results environment 500 can be provided to the user device. Conversely, if a user logs into an account that includes data indicating that the verification service 142 has not provided access approval for that user, then only filtered search results environment 500 can be provided to the user device. In some implementations, logging into a user account can instantiate a device session that is classified according to the access approval data or access denial data stored in the user profile.

Figure 5:
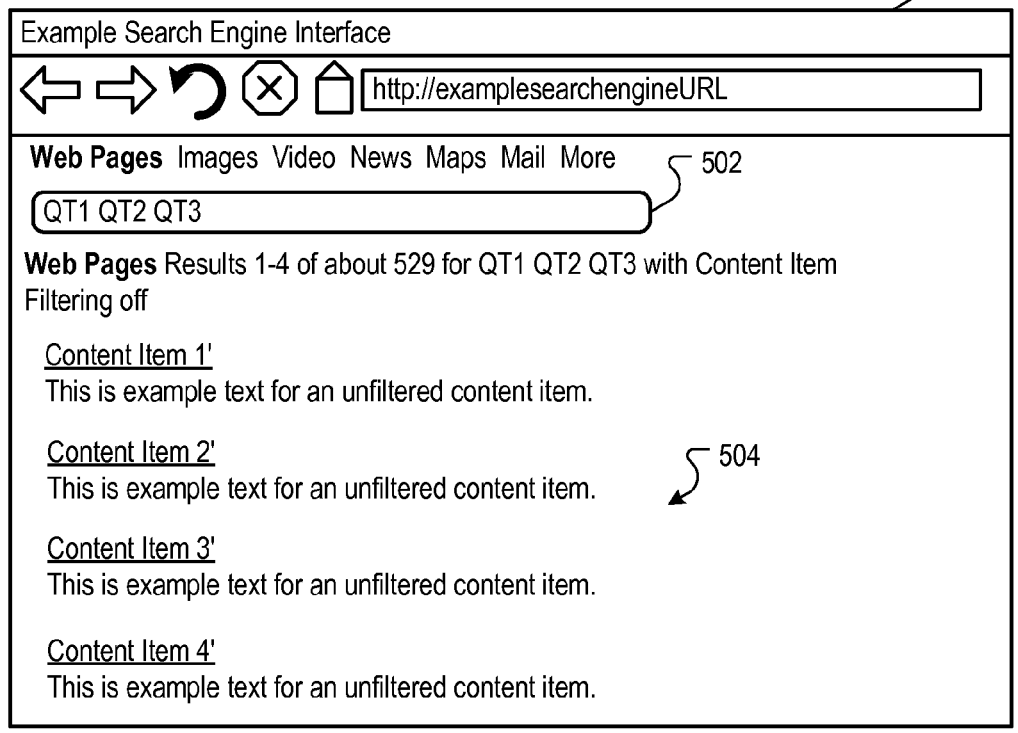
FIG. 5 is an example unfiltered search results environment.

FIG. 5 is an example unfiltered search results environment 500. The unfiltered search results environment 500 can be a web page associated with the search engine 106 or the search access engine 102. A portion of a list 504 of approximately 529 unfiltered content items is displayed. The list 504 thus includes all of the unfiltered content items 124 that are responsive to the query terms QT1, QT2 and QT3.

Figure 6:
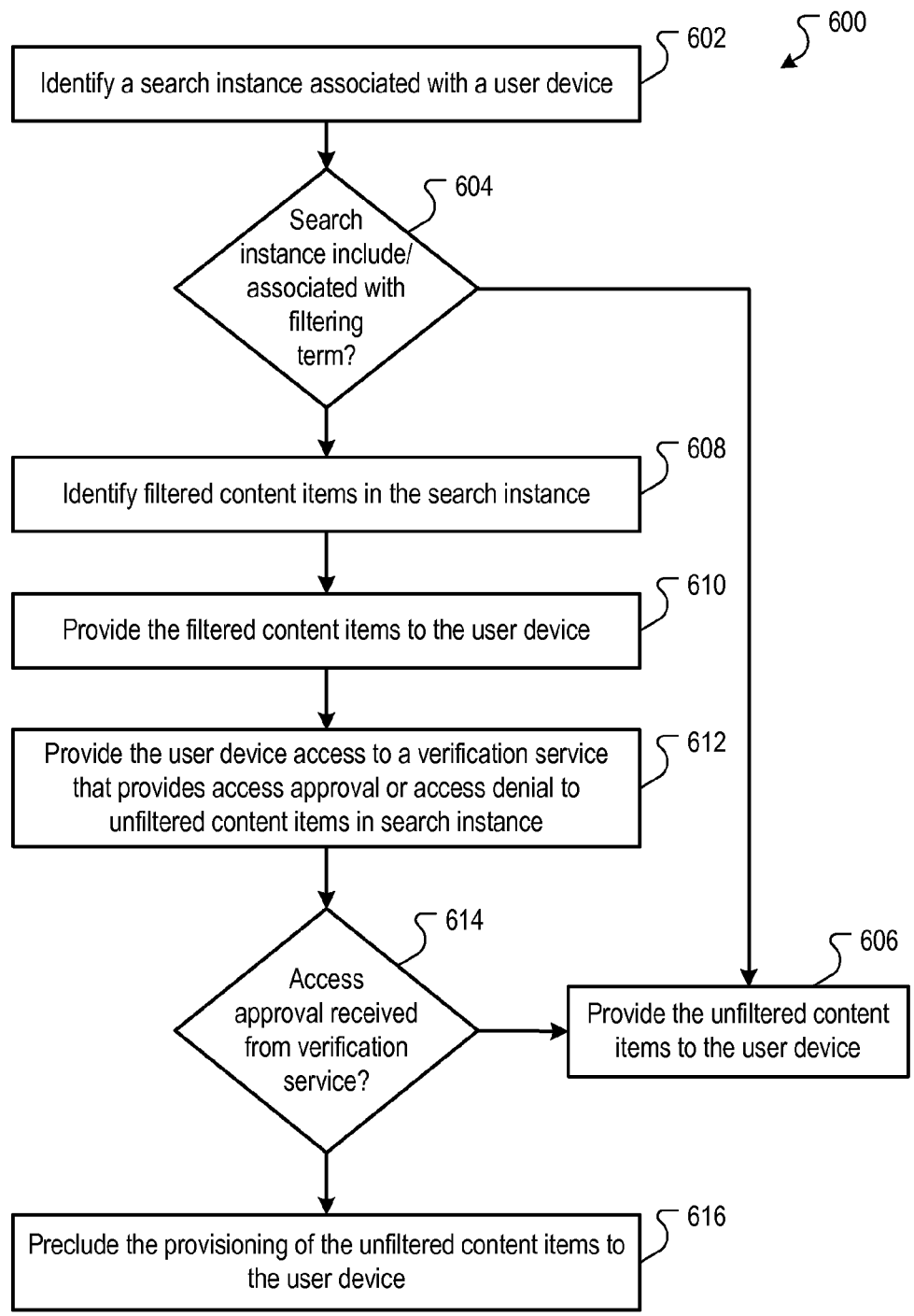
FIG. 6 is a flow diagram of an example search filtering process.

FIG. 6 is a flow diagram of an example search filtering process 600. The process 600 can, for example, be implemented in the search filtering system 100 of FIG. 1.

Stage 602 identifies a search instance associated with a user device. For example, the search access engine 102 can identify a search instance, e.g., a query form the user device 122 or a list of search results responsive to a query from the user device 122.

Stage 604 determines if a search instance includes or is associated with a filtering term. For example, the search access engine 102 can determine if a search instance includes a filtering term as described above, e.g., by determining whether a query includes a filtering term; or whether the unfiltered content items include a filtering term; or whether a content item is flagged with a particular filtering term, e.g., classified as an adult-oriented web site, etc.

If stage 604 determines that the search instance does not include or is not associated with a filtering term, then stage 606 provides the unfiltered content items to the user device. For example, the search access engine 102 can provide the unfiltered content items to the user device 122 (or allow the unfiltered content items to be provided to the user device 122).

If stage 604 determines that the search instance does include a filtering term, then stage 608 identifies filtered content items in the search instance. For example, the search access engine 102 can identify filtering terms in the query or can identify content items that include or are associated with a filtering term. These content items can be excluded from the search results, and the non-excluded content items can be identified as the filtered content items.

Stage 610 provides the filtered content items to the user device. For example, the search access engine 102 can provide the filtered content items to the user device 122 (or allow the filtered content items to be provided to the user device 122).

Stage 612 provides the user device access to a verification service that provides access approval or access denial to unfiltered content items in the search instance. For example, the search access engine 102 can provide verification access instructions 140, e.g., a landing page link, a user identification data input interface, etc. to the user device 122.

Stage 614 determines if access approval is received from the verification service. For example, the search access engine 102 can process data received from the verification service 142 to determine whether access approval or access denial has been received.

If stage 614 determines that access approval is received from verification service, then the process proceeds to stage 606, which provides the unfiltered content items to the user device. For example, the search access engine 102 can provide the unfiltered content items to the user device 122 (or allow the unfiltered content items to be provided to the user device 122).

If stage 614 determines that access approval is not received from the verification service, then stage 616 precludes the provisioning of the unfiltered content items to the user device. For example, the search access engine 102 will the only provide the filtered content items to the user device 122 (or allow the filtered content items to be provided to the user device 122).

Figure 7:
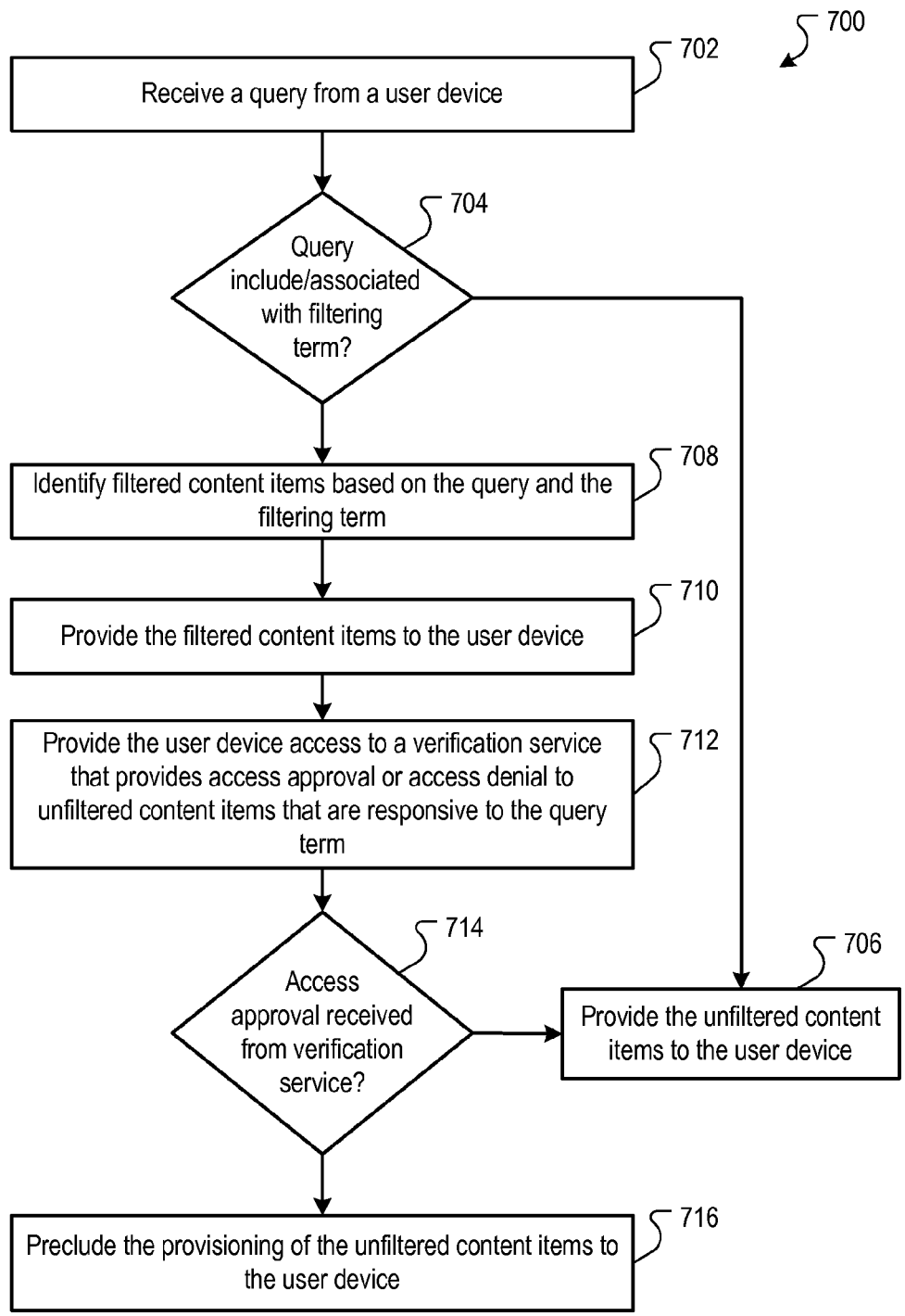
FIG. 7 is a flow diagram of another example search filtering process.

FIG. 7 is a flow diagram of another example search filtering process 700. The process 700 can, for example, be implemented in the search filtering system 100 of FIG. 1.

Stage 702 receives a query from a user device. For example, the search access engine can receive a query from the user device 122.

Stage 704 determines if the query includes or is associated with a filtering term. For example, the search access engine can compare the query to a list of filtering terms 104.

If state 704 determines the query does not include or is not associated with a filtering term, then stage 706 provides the unfiltered content items to the user device. For example, the search access engine 102 can provide the unfiltered content items to the user device 122 (or allow the unfiltered content items to be provided to the user device 122).

If stage 704 determines that the query includes or is associated with a filtering term, then stage 708 identifies filtered content items based on the query and the filtering term. For example, the search access engine 102 can modify a query to remove the filtering term, or revise the query, or can filter the content items that include the filtering term to exclude content items that are, in part, responsive to the filtering term. The non-excluded content items or content items responsive to the revised query can be identified as the filtered content items.

Stage 710 provides the filtered content items to the user device. For example, the search access engine 102 can provide the filtered content items to the user device 122 (or allow the filtered content items to be provided to the user device 122).

Stage 712 provides the user device access to a verification service that provides access approval or access denial to unfiltered content items that are responsive to or associated with the query term. For example, the search access engine 102 can provide verification access instructions 140, e.g., a landing page link, a user identification data input interface, etc. to the user device 122.

Stage 714 determines if access approval is received from the verification service. For example, the search access engine 102 can process data received from the verification service 142 to determine whether access approval or access denial has been received.

If stage 714 determines that access approval is received from verification service, then the process proceeds to stage 706, which provides the unfiltered content items to the user device. For example, the search access engine 102 can provide the unfiltered content items to the user device 122 (or allow the unfiltered content items to be provided to the user device 122).

If stage 714 determines that access approval is not received from the verification service, then stage 716 precludes the provisioning of the unfiltered content items to the user device. For example, the search access engine 102 will only provide the filtered content items to the user device 122 (or allow the filtered content items to be provided to the user device 122).

Figure 8:
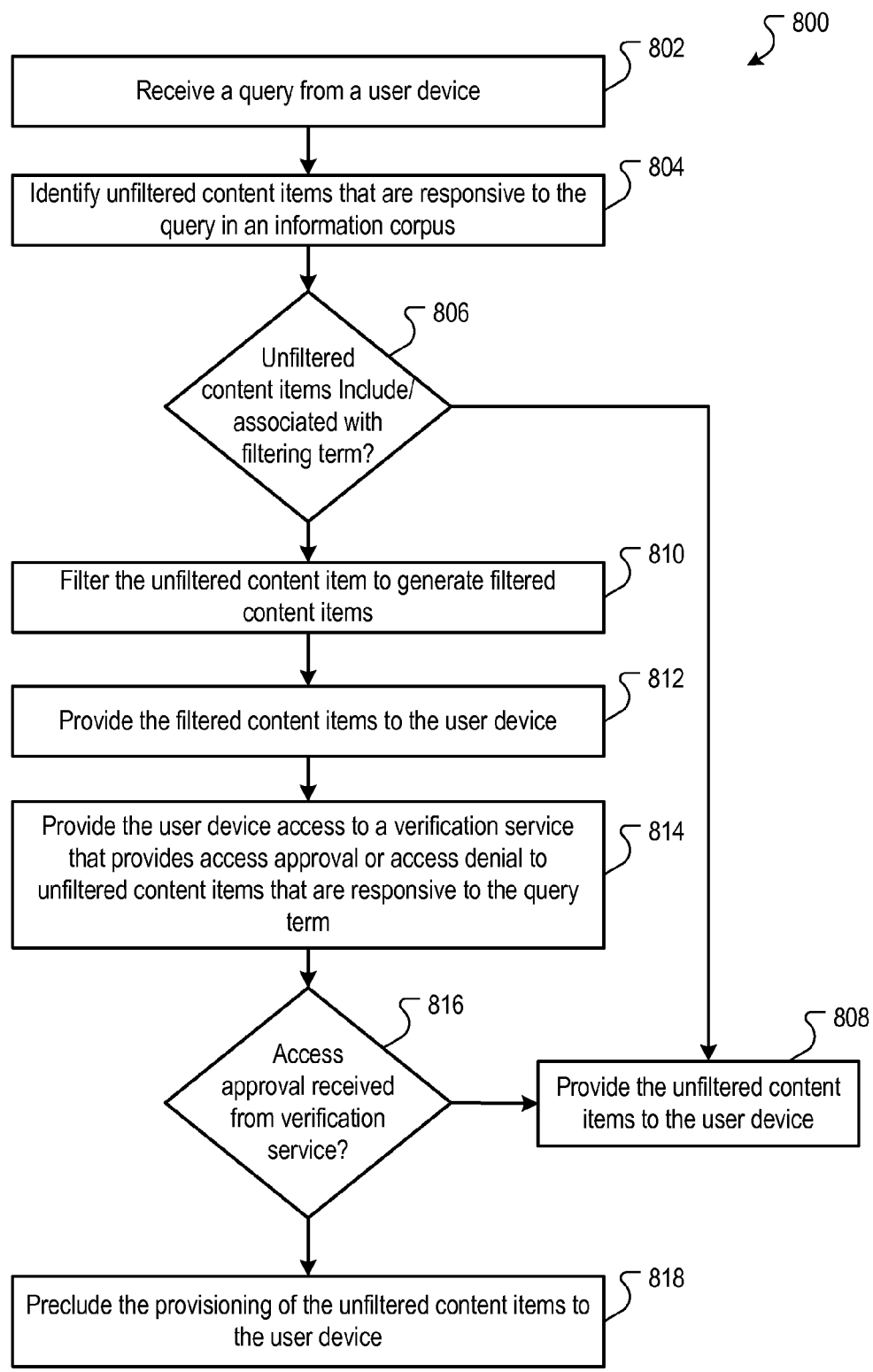
FIG. 8 is a flow diagram of another example search filtering process.

FIG. 8 is a flow diagram of another example search filtering process 800. The process 800 can, for example, be implemented in the search filtering system 100 of FIG. 1.

Stage 802 receives a query from a user device. For example, the search access engine can receive a query from the user device 122.

Stage 804 identifies unfiltered content items that are responsive to the query in an information corpus. For example, the search access engine 102 can provide the query to the search engine 106 to initiate a search of the information corpora 110 for content items that are responsive to the query. The responsive content items are identified as unfiltered content items.

Stage 806 determines if the unfiltered content items include or are associated with a filtering term. For example, the search access engine 102 can identify unfiltered content items that include a filtering term.

If stage 806 determines that the unfiltered content items do not include or are not associated with a filtering term, then stage 808 provides the unfiltered content items to the user device. For example, the search access engine 102 can provide the unfiltered content items to the user device 122 (or allow the unfiltered content items to be provided to the user device 122).

If stage 806 determines that the unfiltered content items do include a filtering term, then stage 810 filters the unfiltered content items to generate filtered content items. For example, the search access engine 102 can identify unfiltered content items that include a filtering term. These unfiltered content items can be excluded from the search results, and the non-excluded unfiltered content items can be identified as the filtered content items.

Stage 812 provides the filtered content items to the user device. For example, the search access engine 102 can provide the filtered content items to the user device 122 (or allow the filtered content items to be provided to the user device 122).

Stage 814 provides the user device access to a verification service that provides access approval or access denial to unfiltered content items that are responsive to the query term. For example, the search access engine 102 can provide verification access instructions 140, e.g., a landing page link, a user identification data input interface, etc. to the user device 122.

Stage 816 determines if access approval is received from the verification service. For example, the search access engine 102 can process data received from the verification service 142 to determine whether access approval or access denial has been received.

If stage 816 determines that access approval is received from verification service, then the process proceeds to stage 808, which provides the unfiltered content items to the user device. For example, the search access engine 102 can provide the unfiltered content items to the user device 122 (or allow the unfiltered content items to be provided to the user device 122).

If stage 816 determines that access approval is not received from the verification service, then stage 818 precludes the provisioning of the unfiltered content items to the user device. For example, the search access engine 102 will only provide the filtered content items to the user device 122 (or allow the filtered content items to be provided to the user device 122).

Figure 9:
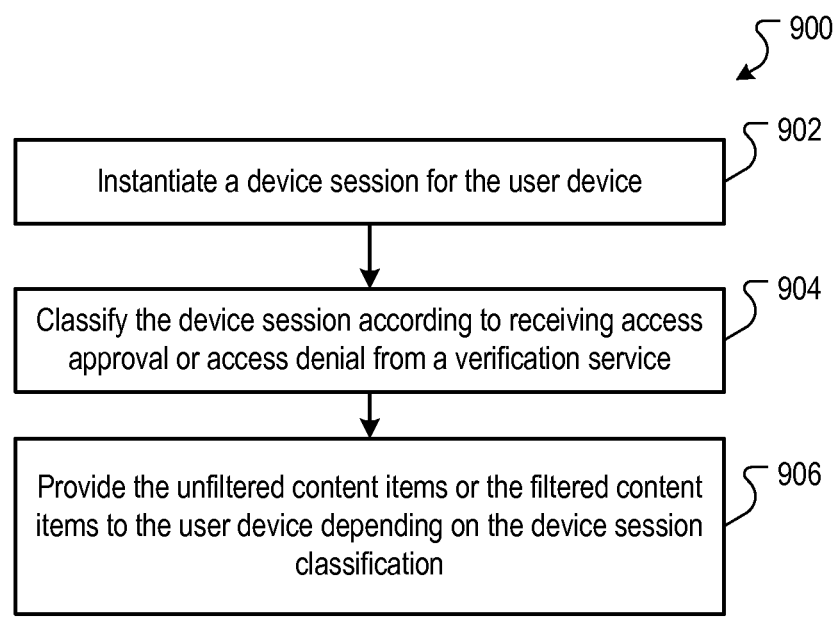
FIG. 9 is a flow diagram of an example session classification process.

FIG. 9 is a flow diagram of an example session classification process 900. The process 900 can, for example, be implemented in the search filtering system 100 of FIG. 1.

Stage 902 instantiates a device session for the user device. For example, the search access engine 102 can process and establish a user login to a user account from the user device 122.

Stage 904 classifies the device session according to receiving access approval or access denial from a verification service. For example, the search access engine 102 can classify the device session as an approved session if the user account to which the user device 122 is logged into includes data indicating access approval for the user associated with the account. Likewise, the search access engine 102 can classify the device session as a denied session if the user account to which the user device 122 is logged into includes data indicating access denial for the user associated with the account.

Stage 906 provides the unfiltered content items or the filtered content items to the user device depending on the device session classification. For example, the search access engine 102 can automatically provide unfiltered content items to a device with a device session classified as an approved session. Likewise, the search access engine 102 can automatically preclude unfiltered content items being delivered to a device with a device session classified as a denied session.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method implemented in a data processing apparatus, comprising:

receiving a query from a user device;

segmenting, by a data processing apparatus, the query into query components, each query component being a term in the query;

accessing, by the data processing apparatus, a keyword hash map for a plurality of keywords corresponding to a plurality of filtering terms, wherein at least one of the filtering terms includes only one component term, and at least one of the filtering terms includes a plurality of component terms in ordinal positions, each keyword being one of the component terms and being mapped to one or more corresponding hashes in the hash map, and each corresponding hash having a corresponding level and a corresponding status, wherein each level corresponds to an ordinal position of its corresponding component term in a query and wherein each status designates its corresponding component term in the hash map as one of a filtering term or unfiltered term;

comparing the query components to the keyword hash map; and determining that the query includes a filtering term when the query components map to component terms in the keyword hash map for which a last query component of a term in the query maps to a component term in the keyword hash map having a status of a filtering term.

2. The method of claim 1, further comprising:

receiving search results that are determined to be responsive to the query;

in response to determining that the query includes the filtering term:

identifying web pages referenced by the search results and that include the filtering term;

generating filtered search results that exclude search results that reference the web pages that are identified as including the filtering term; and providing only the filtered search results in response to the query.

3. The method of claim 1, further comprising determining that the query does not include a filtering term when the query components map to component terms in the keyword hash map for which a last query component of a term in the query maps to a component term in the keyword hash map having a status of an unfiltered term.

4. The method of claim 1, further comprising determining that the query does not include a filtering term when the query components do not map to component terms in the keyword hash map.

5. A system, comprising:

a data processing apparatus; and instructions stored in a non-transitory computer readable storage medium accessible by the data processing apparatus and executable by the data processing apparatus that upon such execution cause the data processing apparatus to perform operations comprising:

receiving a query from a user device;

segmenting the query into query components, each query component being a term in the query;

accessing a keyword hash map for a plurality of keywords corresponding to a plurality of filtering terms, wherein at least one of the filtering terms includes only one component term, and at least one of the filtering terms includes a plurality of component terms in ordinal positions, each keyword being one of the component terms and being mapped to one or more corresponding hashes in the hash map, and each corresponding hash having a corresponding level and a corresponding status, wherein each level corresponds to an ordinal position of its corresponding component term in a query and wherein each status designates its corresponding component term in the hash map as one of a filtering term or unfiltered term;

comparing the query components to the keyword hash map; and determining that the query includes a filtering term when the query components map to component terms in the keyword hash map for which a last query component of a term in the query maps to a component term in the keyword hash map having a status of a filtering term.

6. The system of claim 5, wherein the instructions cause the data processing apparatus to perform operations further comprising:

receiving search results that are determined to be responsive to the query;

in response to determining that the query includes the filtering term:

identifying web pages referenced by the search results and that include the filtering term;

generating filtered search results that exclude search results that reference the web pages that are identified as including the filtering term; and providing only the filtered search results in response to the query.

7. The system of claim 5, wherein the instructions cause the data processing apparatus to perform operations further comprising determining that the query does not include a filtering term when the query components map to components in the keyword hash map for which a last query component of a term in the query maps to a component term in the keyword hash map having a status of an unfiltered term.

8. The system of claim 5, wherein the instructions cause the data processing apparatus to perform operations further comprising determining that the query does not include a filtering term when the query components do not map to component terms in the keyword hash map.

9. A non-transitory computer readable storage medium storing instructions executable by a data processing apparatus that upon such execution cause the data processing apparatus to perform operations comprising:

receiving a query from a user device;

segmenting the query into query components, each query component being a term in the query;

accessing a keyword hash map for a plurality of keywords corresponding to a plurality of filtering terms, wherein at least one of the filtering terms includes only one component term, and at least one of the filtering terms includes a plurality of component terms in ordinal positions, each keyword being one of the component terms and being mapped to one or more corresponding hashes in the hash map, and each corresponding hash having a corresponding level and a corresponding status, wherein each level corresponds to an ordinal position of its corresponding component term in a query and wherein each status designates its corresponding component term in the hash map as one of a filtering term or unfiltered term;

comparing the query components to the keyword hash map; and determining that the query includes a filtering term when the query components map to component terms in the keyword hash map for which a last query component of a term in the query maps to a component term in the keyword hash map having a status of a filtering term.

10. The non-transitory computer readable storage medium of claim 9, wherein the instructions cause the data processing apparatus to perform operations further comprising:

receiving search results that are determined to be responsive to the query;

in response to determining that the query includes the filtering term:

identifying web pages referenced by the search results and that include the filtering term;

generating filtered search results that exclude search results that reference the web pages that are identified as including the filtering term; and providing only the filtered search results in response to the query.

11. The non-transitory computer readable storage medium of claim 9, wherein the instructions cause the data processing apparatus to perform operations further comprising determining that the query does not include a filtering term when the query components map to components in the keyword hash map for which a last query component of a term in the query maps to a component term in the keyword hash map having a status of an unfiltered term.

12. The non-transitory computer readable storage medium of claim 9, wherein the instructions cause the data processing apparatus to perform operations further comprising determining that the query does not include a filtering term when the query components do not map to component terms in the keyword hash map.

* * * * *